(12) United States Patent
Evans et al.

(10) Patent No.: US 9,636,838 B2
(45) Date of Patent: May 2, 2017

(54) BLADE MECHANISM FOR A PLANT MATERIAL TRIMMING DEVICE

(71) Applicant: KEIRTON INC., Surrey (CA)

(72) Inventors: Jay Evans, Surrey (CA); Aaron McKellar, Surrey (CA)

(73) Assignee: KEIRTON INC., Surrey, BC (CA)

( * ) Notice: Subject to any disclaimer, the term of this patent is extended or adjusted under 35 U.S.C. 154(b) by 0 days.

(21) Appl. No.: 14/438,333

(22) PCT Filed: Apr. 3, 2014

(86) PCT No.: PCT/CA2014/050337
§ 371 (c)(1),
(2) Date: Apr. 24, 2015

(87) PCT Pub. No.: WO2014/190425
PCT Pub. Date: Dec. 4, 2014

(65) Prior Publication Data
US 2015/0290827 A1    Oct. 15, 2015

(30) Foreign Application Priority Data

May 31, 2013  (CA) ...................................... 2818320

(51) Int. Cl.
*B26D 1/40* (2006.01)
*B26D 7/26* (2006.01)
*A01G 3/00* (2006.01)

(52) U.S. Cl.
CPC ........... *B26D 7/2614* (2013.01); *A01G 3/002* (2013.01); *B26D 1/40* (2013.01)

(58) Field of Classification Search
CPC . A01D 34/42–34/47; B26B 1/36; B26B 1/40; B26B 1/38; B26B 1/20
(Continued)

(56) References Cited

U.S. PATENT DOCUMENTS 1,836,386 A    12/1931  Nichols et al.
1,945,582 A *  2/1934   White .................... A01D 75/08
                                                  451/423
(Continued)

FOREIGN PATENT DOCUMENTS

CA    2740149    11/2012
CA    2815592    11/2014
CA    2818405    11/2014

OTHER PUBLICATIONS

Keirton Manufacturing Inc., Twister CT110 Instruction Manual, 2010, Canada.
(Continued)

*Primary Examiner* — John G Weiss
(74) *Attorney, Agent, or Firm* — Nexus Law Group LLP

(57) ABSTRACT

A plant material trimming device includes two end walls supporting a rotatable perforated tumbler, a rotatable reel with helical blades, and a blade mechanism pivotably connected to the end walls of the device. The blade mechanism includes: (i) a blade bar configured to cut plant material in cooperation with the helical blades when the device is in operation; (ii) a first arm operatively associated with the blade bar; and (iii) a second arm pivotably connected to the first arm such that the second arm can pivot downward when the blade mechanism is unlocked. A tightening block may be threadedly connected to the second arm and connectable to one of the two end walls. The tightening block may be configured for adjusting the pitch of the blade bar relative to the helical blades when the blade mechanism is locked to the end walls.

20 Claims, 9 Drawing Sheets

(58) Field of Classification Search
USPC .................. 56/249–251; 83/609, 612, 614
See application file for complete search history.

(56) References Cited

U.S. PATENT DOCUMENTS

| | | | |
|---|---|---|---|
| 2,056,369 A | | 10/1936 | Roessel |
| 2,449,042 A | | 9/1948 | Abbrecht |
| 3,430,423 A | * | 3/1969 | Lavond .................. A01D 34/42 56/249 |
| 3,680,293 A | * | 8/1972 | Klemenhagen ........ A01D 34/53 56/249 |
| 6,318,059 B1 | * | 11/2001 | Cotton ................... A01D 34/52 56/251 |
| 6,557,334 B2 | * | 5/2003 | Jager ..................... A01D 34/43 56/249 |
| 7,707,753 B2 | | 5/2010 | Schmeichel |
| 8,127,668 B2 | | 3/2012 | Snyder, Jr. et al. |
| 8,757,524 B2 | | 6/2014 | Mosman |
| 9,161,566 B2 | | 10/2015 | Hall |
| 2013/0175372 A1 | | 7/2013 | Mosman |
| 2014/0196587 A1 | | 7/2014 | Beyerlein et al. |

OTHER PUBLICATIONS

Keirton Manufacturing Inc., Twister T2 Trimming Machine Owners Manual, undated, Canada.
CenturionPro Solutions Inc., Owners Manual the CenturionPro, undated.
CenturionPro Solutions Inc., CenturionPro Silver Bullet, undated.
Zoom Technologies, Zoom DB2100 Instruction Manual, 2016.
Shearline, Shearline Original, undated.

* cited by examiner

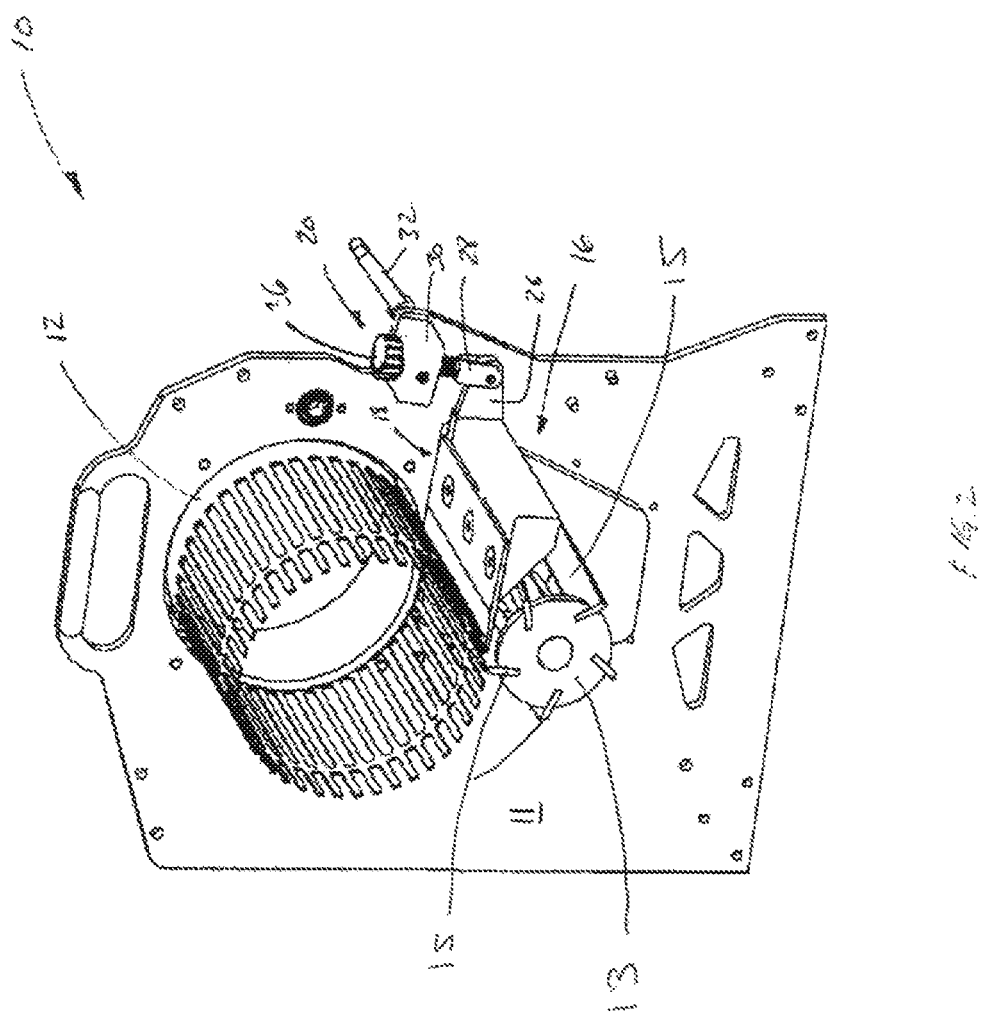

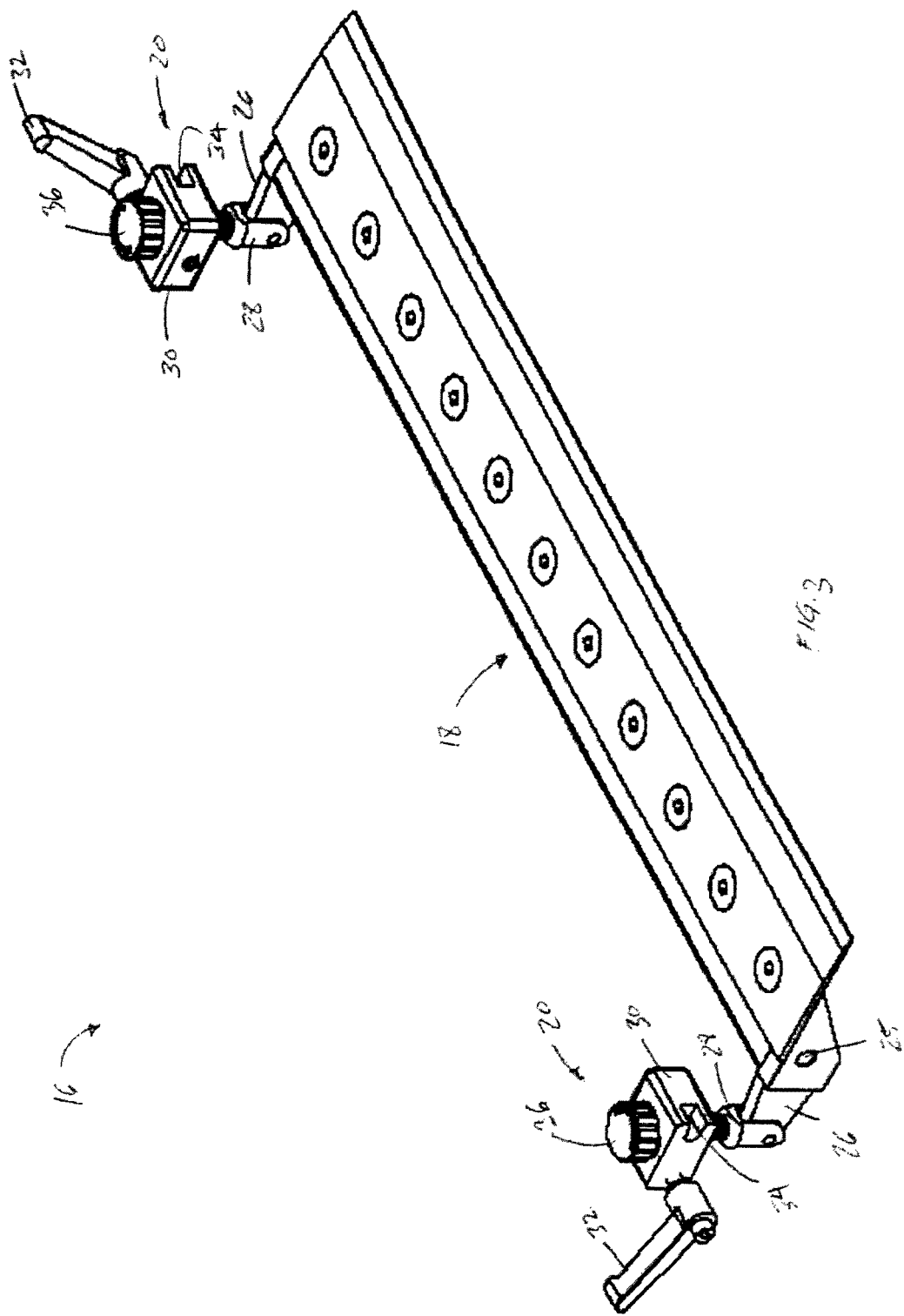

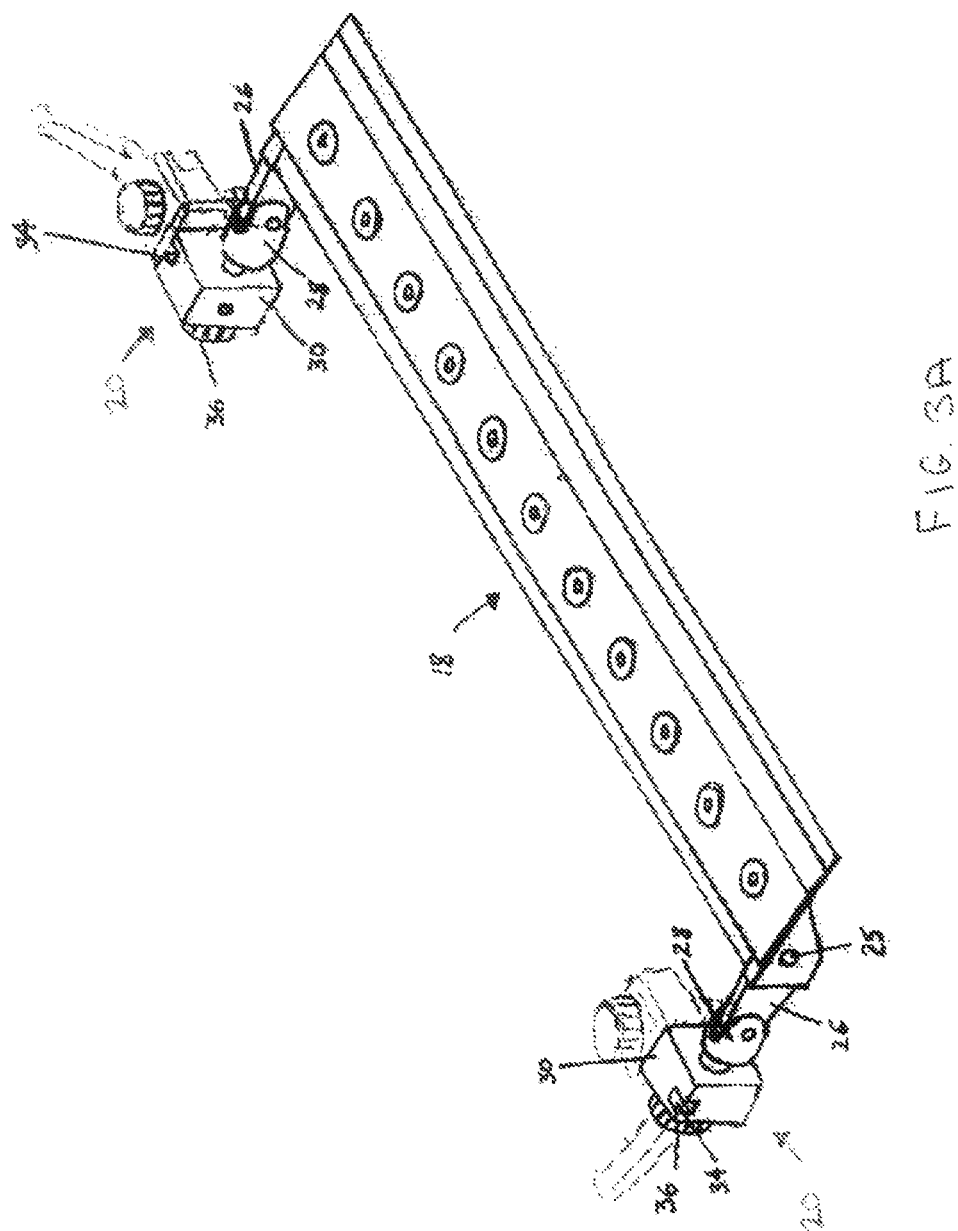

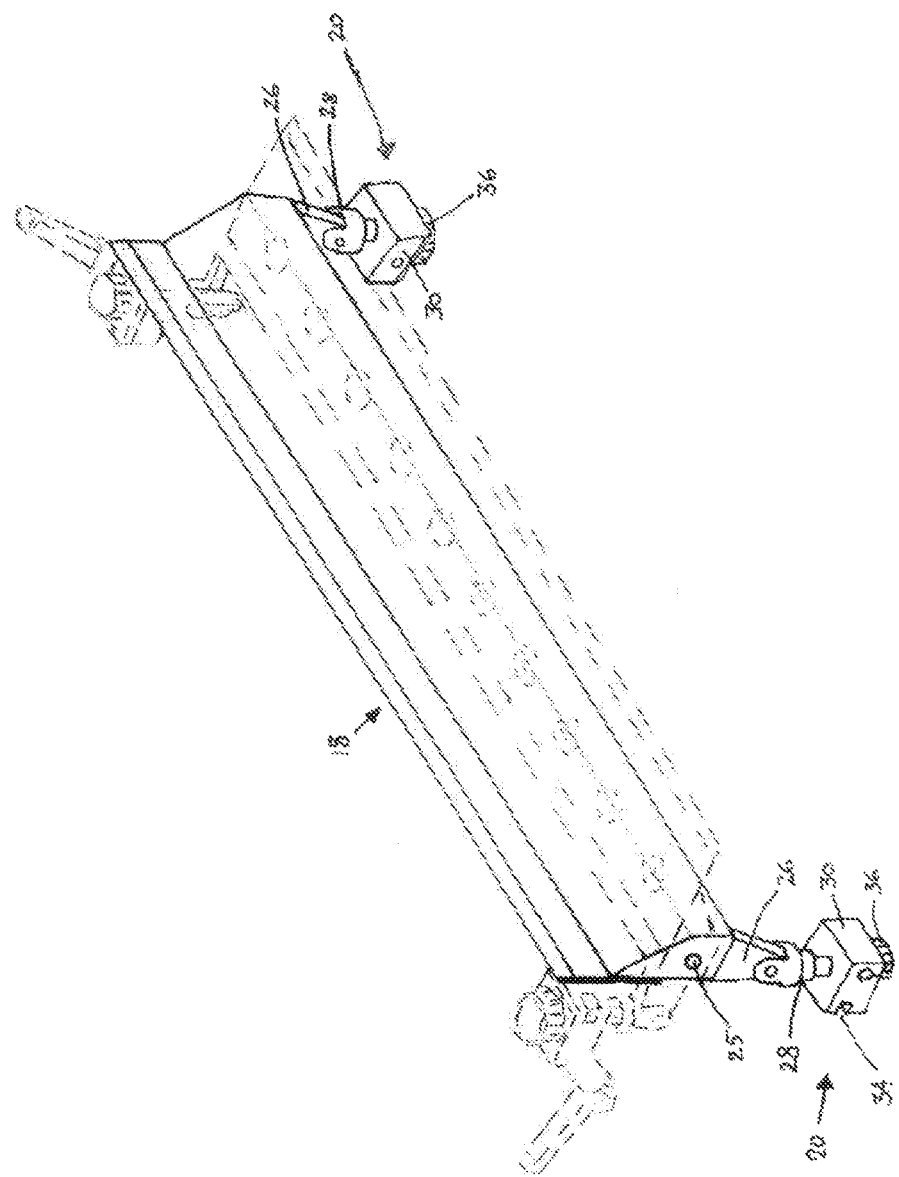

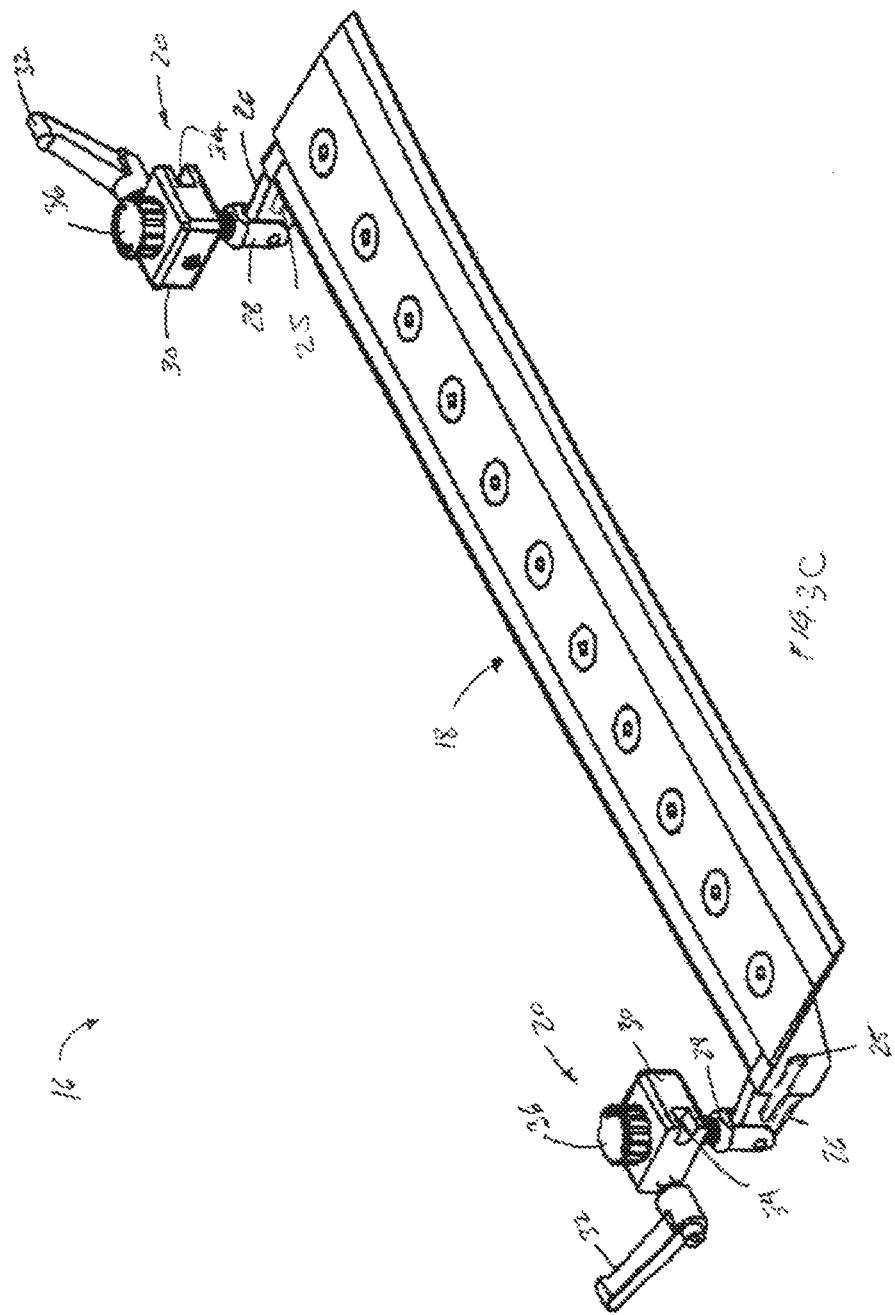

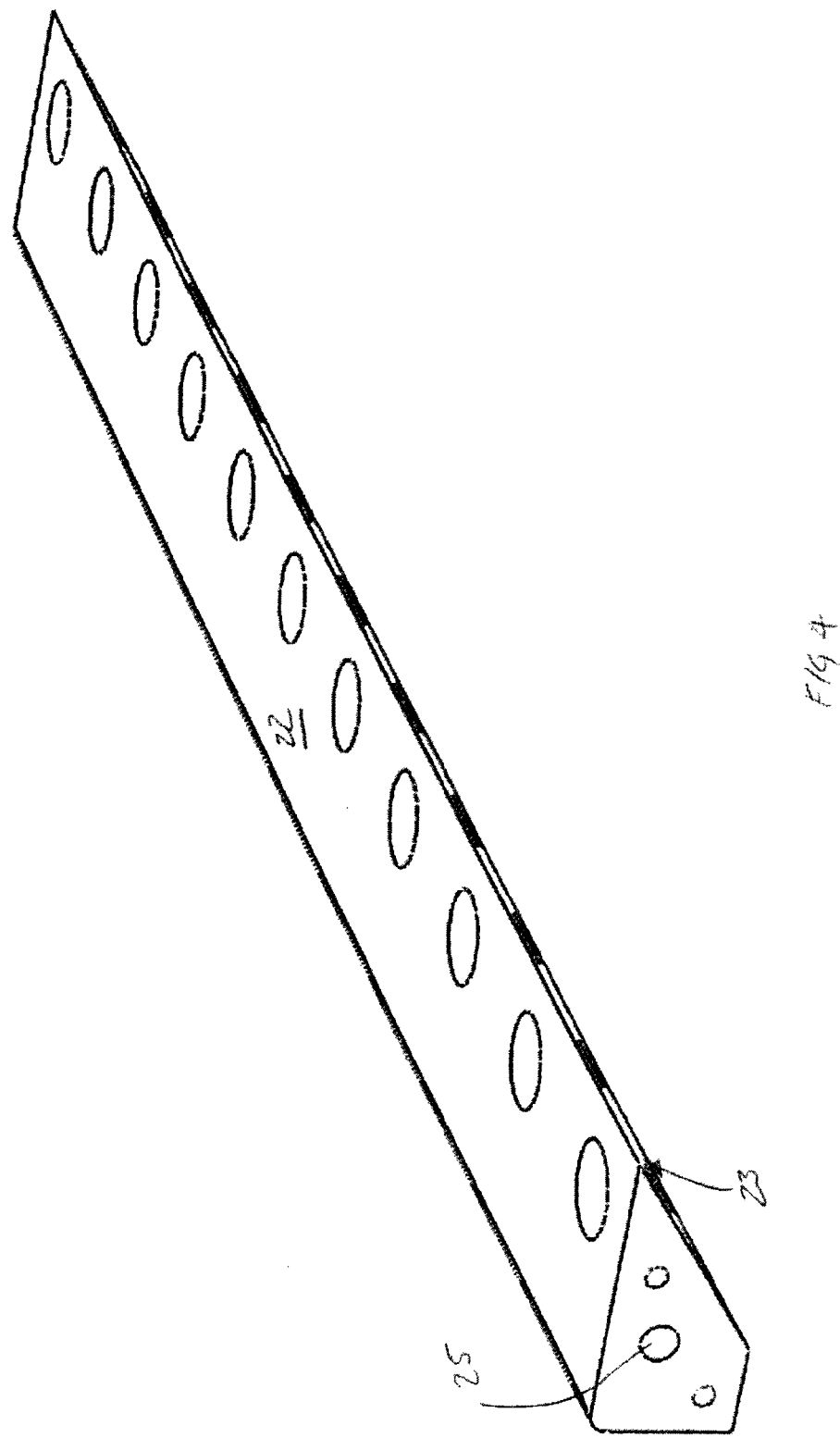

BLADE MECHANISM FOR A PLANT MATERIAL TRIMMING DEVICE

COPYRIGHT NOTICE

This patent document contains material which is subject to copyright protection. The copyright owner has no objection to the facsimile reproduction by anyone of this patent document as it appears in the Patent and Trademark Office patent file or records, but otherwise reserves all copyright rights whatsoever.

FIELD OF THE INVENTION

The invention relates to the field of plant trimming devices, and in particular, to a blade mechanism for a plant material trimming device.

BACKGROUND OF THE INVENTION

Plant trimming devices, which comprise a rotatable perforated tumbler, a cutting mechanism that comprises a rotatable reel with helical blades, and a bed bar with a straight blade, have been in operation for some time. Examples are provided by U.S. Pat. No. 9,161,566 (Hall) and US Patent Application Number 2014/0196587 (Beyerlein & Luo). Another example of a plant trimming device comprising a tumbler and cutting reel is described in U.S. Pat. No. 8,757,524 (Mossman). Generally, these devices (not Mossman) incorporate a fixed blade mechanism that works in cooperation with the helical blades for trimming away plant material rotated in an adjacent tumbler. Typically, these blade mechanisms include a blade bar which may be a unitary blade or may include a bed bar that holds a blade. As conventional blade mechanisms are fixed to the end walls of the plant trimming devices, cleaning plant trimming devices is labor intensive with a user having to contort oneself in order to get in between the tumbler and the blade mechanism. The tumbler is usually removed to enable access to the cutting blades. In other instances, in order to clean and maintain the blade, the entire plant trimming device has to be dismantled with appropriate tools in order to remove the blade mechanism from the device. Finally, with conventional blade mechanisms, fine tuning its contact with the cutting reel requires appropriate tools, making it time consuming to use. Accordingly, a need exists for a blade mechanism that can be easily removed from it's engaged position and adjusted without the need for tools. Other objects of the invention will be apparent from the description that follows.

SUMMARY OF THE INVENTION

According to the present invention there is provided a pivotable blade mechanism for a plant material trimming device, which comprises a rotatable perforated tumbler, and a cutting mechanism that comprises a rotatable reel with helical blades. The blade mechanism comprises a blade bar, is connectable to the end walls of the plant material trimming device and hand-operated means for adjusting, unlocking and locking connectable to the blade bar and to the end walls of the plant material trimming device to lock the blade bar to the plant material trimming device.

The blade bar may be a single blade or may include a bed bar and a blade connectable to the bed bar.

The blade mechanism may be slidably and/or pivotably connectable to the plant trimming device through pivot holes. When pivotably connected, the hand-operated means for adjusting, unlocking and locking is operational to lock and adjust the angle of the blade bar relative to the plant trimming device.

The hand-operated means for adjusting, unlocking and locking may simply be a clamp, bungee cord or other like device. In the preferred embodiment, the hand-operated means for adjusting, unlocking and locking comprises a first arm connectable to the blade bar and a second arm connectable to the first arm. A tightening block is connectable (may be threadedly) to the second arm and is also connectable to the plant trimming device to lock the blade bar in place. The first arm may be pivotably connectable to the blade bar. Additionally, the second arm may also be pivotably connectable to the first arm at the juncture between the first arm and the second arm.

Other aspects of the invention will be appreciated by reference to the detailed description of the preferred embodiment and to the claims that follow.

BRIEF DESCRIPTION OF THE DRAWINGS

The preferred embodiment of the invention will be described by reference to the drawings thereof in which:

FIG. 2 is a partial internal perspective view of the plant material trimming device of FIG. 1.;

FIG. 3 is a perspective view a blade mechanism for the plant material trimming device of FIG. 1.;

FIG. 3A is a perspective view of the blade mechanism in FIG. 3, wherein the second arm of the hand-operated means for adjusting, unlocking and locking has been pivoted to an unlocked position as in FIG. 6;

FIG. 3B is a perspective view of the blade mechanism in FIG. 3, wherein the first arm of the hand-operated means for adjusting, unlocking and locking and the blade bar have pivoted around the pivot holes at the point of attachment to the end walls causing the blade to pivot up to enable cleaning;

FIG. 3C is a perspective view of the blade mechanism in FIG. 3, illustrating an embodiment comprising a slotted hole in the blade mechanism;

FIG. 4 is perspective view of an alternative embodiment of a blade bar of FIG. 3;

in FIG. 1, the hand-operated means for adjusting, unlocking and locking is in the locked position; in FIG. 6, the hand-operated means for adjusting, unlocking and locking has been released by rotating the handle and pivoting the second arm down around the juncture between the first and second arms, relative to it's position in FIG. 1.

DESCRIPTION OF THE PREFERRED EMBODIMENT OF THE INVENTION

Figure 1:
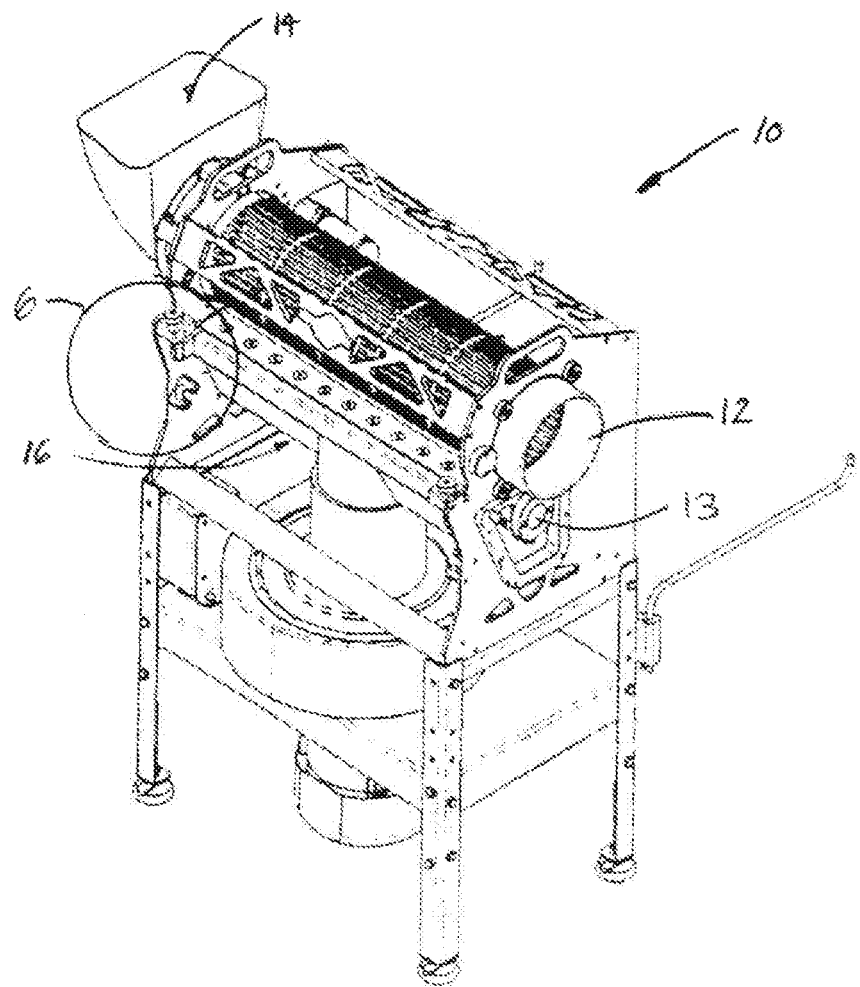
FIG. 1 is a perspective view of a plant material trimming device.

Referring to FIG. 1, a plant material trimming device 10 is depicted. The device 10 includes a tumbler 12, a rotatable reel 13 with helical blades 15 and a bed bar with a straight blade residing inside of the device. Plant material that requires trimming is inserted into a hopper 14 which then feeds the plant material into the tumbler 12. A blade mechanism 16 is pivotably attached to the end walls 11 and is situated inside of the device 10 adjacent the tumbler 12 and the rotatable reel 13 with helical blades 15. As the plant material is tumbled in the tumbler 12, the blade mechanism 16 in cooperation with the helical blades 15 cuts the plant material in a scissor-like fashion as the plant material is exposed between the blade mechanism and tumbler walls.

Figure 5:
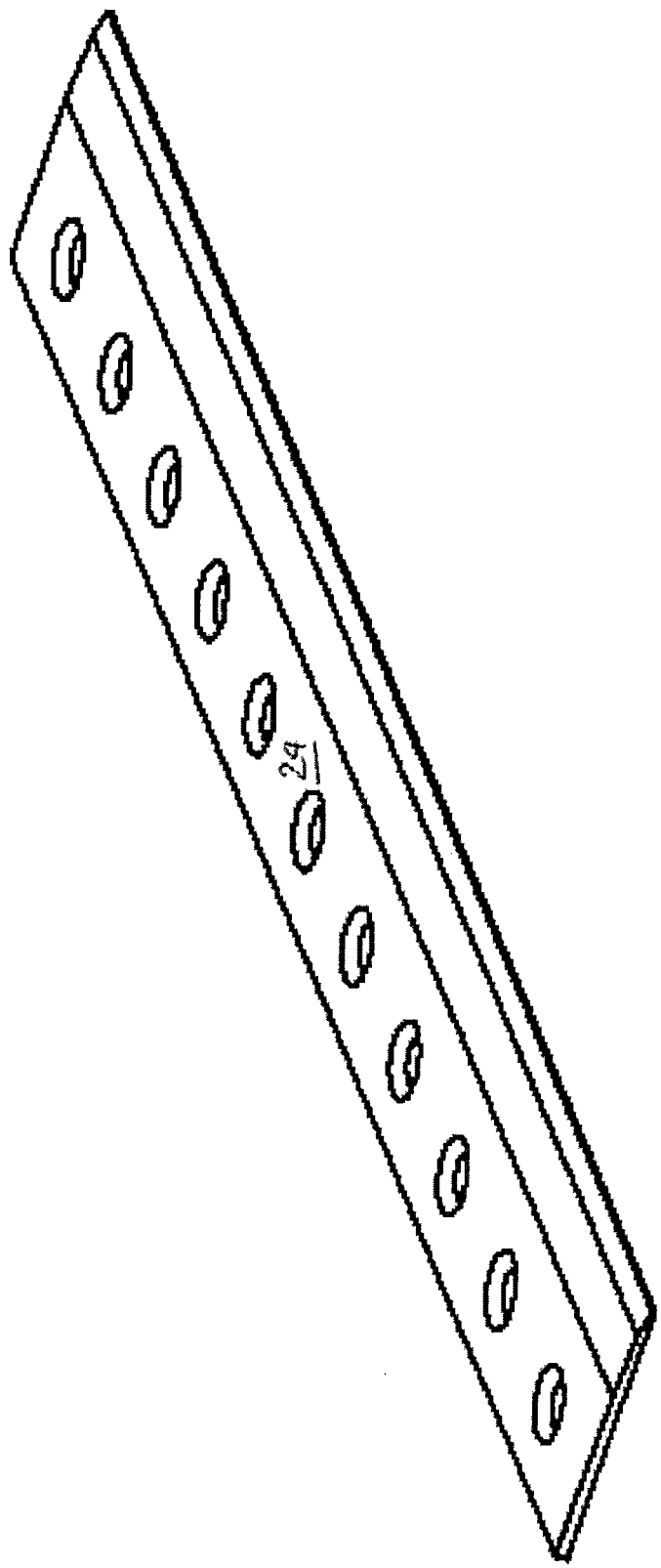
FIG. 5 is a perspective view of a blade used in conjunction with the blade bar of FIG. 4.

Referring to FIGS. 2 and 3 the blade mechanism 16 includes a blade bar 18 and is pivotably connectable to a wall 11 of the plant material trimming device 10 through pivot holes 25 and a hand-operated means for adjusting, unlocking and locking 20 connectable to the blade bar 18 at either ends of the blade bar 18, through the hand-operated means for adjusting, unlocking and locking' first arms 26 and second arms 28. The tightening block 30 of the hand-operated means for adjusting, unlocking and locking 20 is also connectable to the wall 11 of the plant material trimming device 10 to lock the blade bar 18 to the plant material trimming device. The blade bar 18 may be a single unitary blade or may, as illustrated in FIGS. 4 and 5, include a bed bar 22 with a longitudinally slit 23 for receiving a separate blade 24 connectable to the bed bar through conventional means.

Referring back to FIGS. 2 and 3, the blade bar 18 may either be slidably and/or pivotably connectable to the plant trimming device 10. As best illustrated in FIG. 3, corresponding pivot holes 25 on either side of the blade bar 18 are operable to receive a pin from the plant trimming device 10. As those skilled in the art will appreciate, a slotted hole may be used instead of a standard hole to allow the bed bar 18 to slidably and pivotably connect to the plant trimming device 10. When pivotably connected, the hand-operated means for adjusting, unlocking and locking 20 is operational to lock and adjust the angle of the blade bar 18 relative to the tumbler 12 and the blades 15 of the cutting reel 13 as shown in FIG. 2 of the plant trimming device 10.

Figure 6:
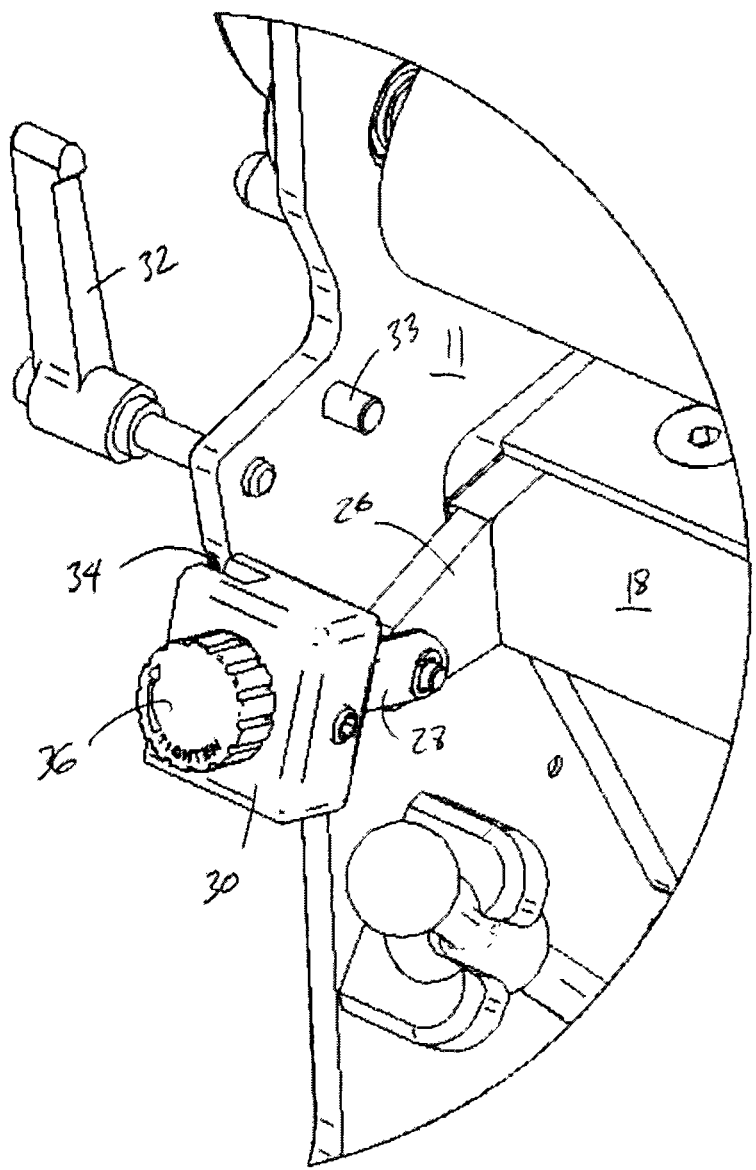
FIG. 6 is an isolation perspective view of the area 6 of FIG. 1.

The hand-operated means for adjusting, unlocking and locking 20 may simply be a clamp, bungee cord or other like device that is operable to connect to the plant trimming device 10. In the preferred embodiment as illustrated in FIGS. 2, 3 and 6, the hand-operated means for adjusting, unlocking and locking includes a first arm 26 connectable to the blade bar 18 and a second arm 28 connectable to the first arm. A tightening block 30 is connectable to the second arm 28 and is also connectable to the wall 11 of the plant trimming device 10 to lock the blade bar 18 in place. The first arm 26 may be pivotably connectable to the blade bar 18. Additionally, the second arm 28 may also be pivotably connectable to the first arm 26. To lock the bed bar 18 to the device 10, the hand-operated means for adjusting, unlocking and locking 20 may include a locking handle 32. The locking handle 32 may be threadedly connectable to the tightening block 30 through a hole in wall 11. As those skilled in the art will appreciate, tightening block may be configured to lock to wall 11 without handle 32 through other conventional devices. To facilitate alignment of the blade bar 18 inside of the device 10, wall 11 may include a locating pin 33 for which slot 34 of the tightening block 30 may engage. Once the blade bar 18 is inserted into the device 10, the second arm 28 is moved to engage the locating pin 33 and handle 32 is used to tighten the tightening block 30 to the wall 11. If it is desirable to adjust the angle of the blade bar 18 relative to the tumbler 12, the second arm 28 may be threadedly connected to the tightening block 30. Here, dial 36 may be used to lengthen or shorten the second arm 28 and thus pitch the blade bar 18 within the device 10.

FIG. 2 illustrates the relative position of the tumbler 12, the blade mechanism 16, and the rotatable reel 13 within the end walls 11 of the trimming device, ready for operation. As known in the art, in order to clean the trimming device, the tumbler 12 is removed. FIGS. 3A and 6 show how the locking handle 32 is rotated out, the tightening block 30 is released from pin 33 and allowed to pivot downwards around the juncture between the first arm and the second arm. FIG. 3B illustrates the configuration wherein the hand-operated means for adjusting, unlocking and locking 20 (minus the handle 32 and pin 33, which remain attached to the wall) is pivoted downwards and the blade bar 18 has pivoted upwards around the pins (not shown) in the pivot hole 25 of the blade mechanism 16.

It will thus be seen that a new and novel blade mechanism for a plant material trimming device has been illustrated and described and it will be apparent to those skilled in the art that the preferred and alternative embodiments have been described in some detail but that certain modifications may be practiced without departing from the principles of the invention.

What is claimed is:

1. A plant material trimming device, the device comprising: two end walls supporting a rotatable perforated tumbler, a rotatable reel with helical blades, and a blade mechanism pivotably connected to the end walls of the device, the blade mechanism comprising:
   i. a blade bar configured to cut plant material in cooperation with the helical blades when the device is in operation;
   ii. two hand-operated means for adjusting, unlocking and locking, positioned respectively at the ends of the blade bar, for unlocking and locking the blade mechanism from and to the end walls of the plant material trimming device, wherein each hand-operated means for adjusting, unlocking and locking comprises:
      a. a first arm operatively associated with the blade bar; and
      b. a second arm, pivotably connected to the first arm, wherein the second arm can pivot downward when the blade mechanism is unlocked.

2. The plant material trimming device of claim 1, wherein the blade mechanism is pivotable about a pin in the end wall of the plant trimming device.

3. The plant material trimming device of claim 1, wherein each hand-operated means for adjusting, unlocking and locking comprises a tightening block threadedly connected to the second arm and connectable to an end wall of the plant trimming device.

4. The plant material trimming device of claim 3, wherein each hand-operated means for adjusting, unlocking and locking comprises a locking pin which is inserted through a hole in the end wall of the plant trimming device and is threadedly connectable with the tightening block.

5. The plant material trimming device of claim 4, wherein the locking pin is operationally associated with a locking handle, to threadedly lock and unlock the tightening block from and to the end wall of the plant trimming device.

6. The plant material trimming device of claim 3, wherein when the tightening block is unlocked and the second arm is pivoted downwards, the blade bar can pivot upwards away from the helical blades.

7. The plant material trimming device of claim 3, wherein the tightening block is configured for adjusting the pitch of the blade bar relative to the helical blades when the blade mechanism is locked to the end walls.

8. A blade mechanism for a plant material trimming device, the device comprising two end walls supporting a rotatable perforated tumbler, and a rotatable reel with helical blades, the blade mechanism comprising:

iii. a blade bar configured to cut plant material in cooperation with the helical blades when the device is in operation;

iv. two hand-operated means for adjusting, unlocking and locking, positioned respectively at the ends of the blade bar, for unlocking and locking the blade mechanism from and to the end walls of the plant material trimming device, wherein each hand-operated means for adjusting, unlocking and locking comprises:

c. a first arm operatively associated with the blade bar; and d. a second arm, pivotably connected to the first arm, wherein the second arm can pivot downward when the blade mechanism is unlocked, wherein the blade mechanism is pivotably connectable to the end walls of the device.

9. The blade mechanism of claim 8, wherein the blade mechanism is pivotably connectable to a pin in the end wall of the plant trimming device.

10. The blade mechanism of claim 8, wherein each hand-operated means for adjusting, unlocking and locking comprises a tightening block threadedly connected to the second arm and connectable to an end wall of the plant trimming device.

11. The blade mechanism of claim 10, wherein each hand-operated means for adjusting, unlocking and locking comprises a locking pin which is insertable through a hole in the end wall of the plant trimming device and is threadedly connectable to the tightening block.

12. The blade mechanism of claim 11, wherein the locking pin is operationally associated with a locking handle to threadedly unlock and lock the tightening block from and to the end wall of the plant trimming device when the locking pin is inserted through the hole and threadedly connected to the tightening block.

13. The blade mechanism of claim 10, wherein the tightening block is configured for adjusting the pitch of the blade bar relative to the helical blades when the blade mechanism is locked to the end walls.

14. The blade mechanism of claim 10, wherein the tightening block is configured for engaging a locating pin in the end wall of the plant trimming device.

15. The blade mechanism of claim 10, wherein the blade bar is a blade.

16. The blade mechanism of claim 10, wherein the blade bar comprises a bed bar and a blade connectable to the bed bar.

17. The blade mechanism of claim 10, wherein the blade mechanism is also slidably connectable to the end walls of the plant trimming device.

18. The blade mechanism of claim 10, wherein the first arm of each of the hand-operated means for adjusting, unlocking and locking is pivotably connectable to an end wall of the plant trimming device.

19. The blade mechanism of claim 10, wherein the first arm is pivotably connected to the blade bar.

20. The blade mechanism of claim 10, wherein the blade bar is pivotably connectable to the end walls of the plant trimming device.

* * * * *